United States Patent [19]

Gervais

[11] Patent Number: 4,999,601

[45] Date of Patent: Mar. 12, 1991

[54] MEMORY CARD READ/WRITE DEVICE PROVIDED WITH AN ANTI-FRAUD DEVICE

[75] Inventor: Michel Gervais, L'Hay les Roses, France

[73] Assignee: Schlumberger Industries, Montrouge, France

[21] Appl. No.: 289,136

[22] Filed: Dec. 23, 1988

[30] Foreign Application Priority Data

Dec. 28, 1987 [FR] France .............................. 87 18227

[51] Int. Cl.$^5$ ............................................ G06K 19/06
[52] U.S. Cl. .................................... 235/492; 235/488
[58] Field of Search .............................. 235/492, 488

[56] References Cited

U.S. PATENT DOCUMENTS 4,105,156  8/1978  Dethloff .

4,707,594  11/1987  Roty ..................................... 235/492

FOREIGN PATENT DOCUMENTS 2554262  5/1985  France .

Primary Examiner—Harold I. Pitts
Attorney, Agent, or Firm—Frishauf, Holtz, Goodman & Woodward

[57] ABSTRACT

In order to avoid attempted fraud, the reader is provided with a detector for detecting a conductor wire disposed fraudulently in the insertion passage. The detector comprises a conducting plate (50) disposed across the passage. The plate (50) is fed with A.C. (62). When a fraudulent conductor wire (46) is connected to one of the contact blades (26) of the read head (28), the detector circuit is looped by capacitive coupling between the wire (46) and the plate (50).

9 Claims, 2 Drawing Sheets

MEMORY CARD READ/WRITE DEVICE PROVIDED WITH AN ANTI-FRAUD DEVICE

The present invention relates to a memory card read/write device provided with an anti-fraud device.

BACKGROUND OF THE INVENTION

Systems for providing goods or services by means of electronic memory cards comprise cards held by users and read/write devices associated with the machines for providing goods or services. In order to obtain goods or service, the user inserts a card into the read/write device so as to enable the device to verify that the card does indeed give access to the goods or services under consideration, and so as to modify the balance contained in the card as a function of the goods or service provided. Under some circumstances, the reader can also be used to verify that the cardholder is the legitimate card owner.

Memory cards are of the prepaid type, i.e. in order to obtain the right to use a card, the user must initially pay the organization providing the goods or services an amount of money which is not less than the amount required to obtain the goods or services authorized by the card. It is therefore tempting for a dishonest person to make a card having the same electronic circuits as a genuine card and containing the same information and/or programs as a genuine card.

Although it is possible to take a genuine card and determine its geometrical characteristics and identify the nature of the circuit it contains, it is, in contrast, impossible or quasi-impossible to determine the information and the programs contained in the circuits in such a card, and in particular it is practically impossible to determine how information progresses during utilization of the card by virtue of the dialog which then takes place between the read/write device and the circuit in the card.

One way for a dishonest person to solve this problem consists in acting directly on the read/write device. To do this, a "fake" card having the same geometrical characteristics and the same external contacts as a genuine card is inserted into the read/write device, but the circuit in the fake card is replaced by conductors which are embedded in the card body and which are connected to contacts external to the card and lying outside the read/write device. The other ends of these wires can the be connected to powerful data processing means capable of receiving and analyzing the electrical signals generated by the read/write device and capable of simulating the signals normally emitted by a card until the entire information interchange procedure has been reconstituted.

In order to counter this attempt at dishonest use, proposals have already been made in French patent number 2,554,262 granted May 18, 1987, to provide the reader device with means for detecting the presence of extraneous conductor wires inserted into the read/write device.

The object of the present invention is to provide an improved embodiment of a read/write device provided with such a detector device.

SUMMARY OF THE INVENTION

According to the invention, the read/write device comprises a processing circuit, a card insertion slot, a connection head including at least one connection element for electrically connecting the circuit of said card to said processing circuit when said card is in a processing position, guide means for guiding said card between the insertion slot and said processing position, and detector means for detecting an extraneous conductor wire inserted in said device, wherein the device further includes a conductor element disposed substantially parallel to the direction of card insertion between said slot and said connection head in order to intercept the entire path between said slot and said connection head, and an electric circuit established between at least one contact element of said connection head and said conductor element, said circuit including an A.C. signal generator; and a detector for detecting the appearance of an alternating signal at a point of said circuit due to the effect of capacitive coupling between said conductor element and an extraneous conductor wire electrically connected to said connector and extending past said conductor element.

Thus, as soon as an extraneous conductor wire has been fraudulently inserted into the read/write device, capacitive coupling is set up between the conducting detector element, e.g. a detection plate, and the conductor wire which is electrically connected to the connection head. The detection circuit is then closed by the capacitance constituted by the plate and the conductor wire. The wire can thus be detected even if it is screened, and even if no current is flowing along the wire.

BRIEF DESCRIPTION OF THE DRAWINGS

Embodiments of the invention are described by way of example with reference to the accompanying drawings, in which.

MORE DETAILED DESCRIPTION

In the following description, the term "reader" is used by way of simplification in order to designate the card read/write device. In other words, the "reader" is capable of both reading and writing information in the card, or else is capable of performing only one of these two operations.

Figure 2:
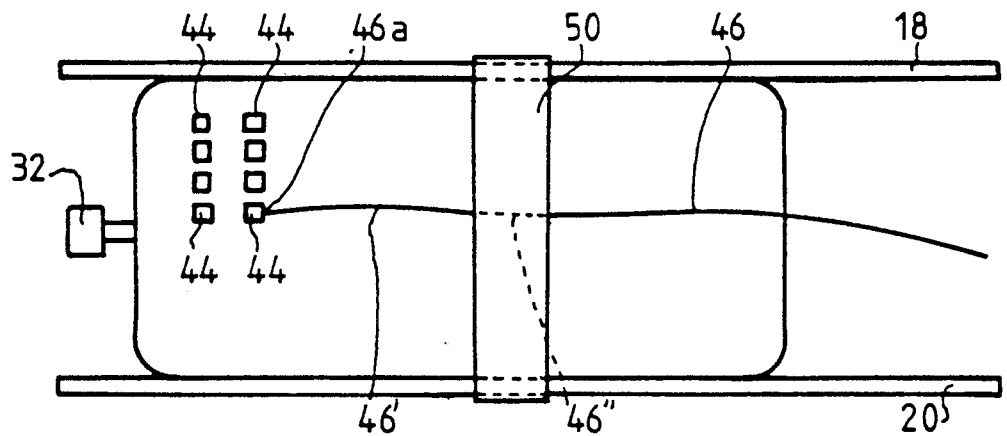
FIG. 2 shows a first way of implanting the conducting plate of the detector.

FIG. 2 shows a reader assembly provided with a detector device for detecting extraneous or fraudulent conductor wires. The reader comprises a card insertion slot 10, a card guide passage 12, and a connection head 14. The guide passage is delimited by a floor 16 and by two side walls 18 and 20 which are visible in FIGS. 2 and 3. The reader may also include a card drive system 22 for automatically bringing the card into a processing position, i.e. into contact with the connection head 14. The connection head 14 essentially comprises an insulating support 24 and flexible conductor blades 26 constituting contact elements. The conducting blades 26 are connected to a processing circuit 28 by conductors 30.

The reader also includes a microswitch 32 or the like for delivering a signal which is transmitted to the processing circuit 28 when the card is in the processing position.

Figure 1:
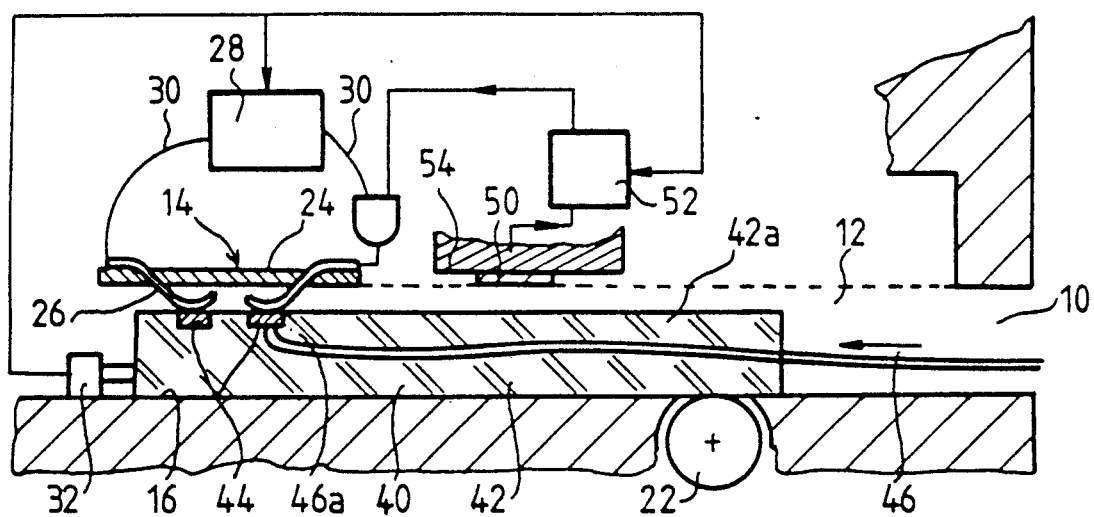
FIG. 1 is a vertical section through a read/write device in accordance with the invention.

FIG. 1 also shows a "fake" card 40 used in an attempted fraud. The card comprises a body 42 identical to the body of a genuine card and having external electrical contact tabs 44 which occupy the same positions on the top face 42a of the card body as are occupied by the tabs of a genuine card. The figure also shows a conductor wire 46 whose end 46a is connected to a tab 44, with the wire 46 being embedded in the body of the card 42 and leaving the reader via the insertion slot 10. The other end of the conductor 46 may be connected to a processor system. The fake card 40 may have as many conductors 46 as there are contact tabs 44.

The reader also includes a detector device for detecting fraudulent conductor wires (wires 46), which device is shown diagrammatically in FIGS. 1 and 2. The detector device essentially comprises a conducting plate 50 and a detector circuit 52. The plate 50 is fixed to a support element 54 of the reader.

As shown better in FIG. 2, the plate 50 extends over the entire width of the guide passage 12, i.e. all the way from its first side wall 18 to its second side wall 20. Thus, any path going from the insertion slot 10 to the connection head 14 is intercepted by the plate 50. In other words, any conductor wire inserted into the guide passage 12 and connected to the connection head must go past the plate 50.

Figure 3:
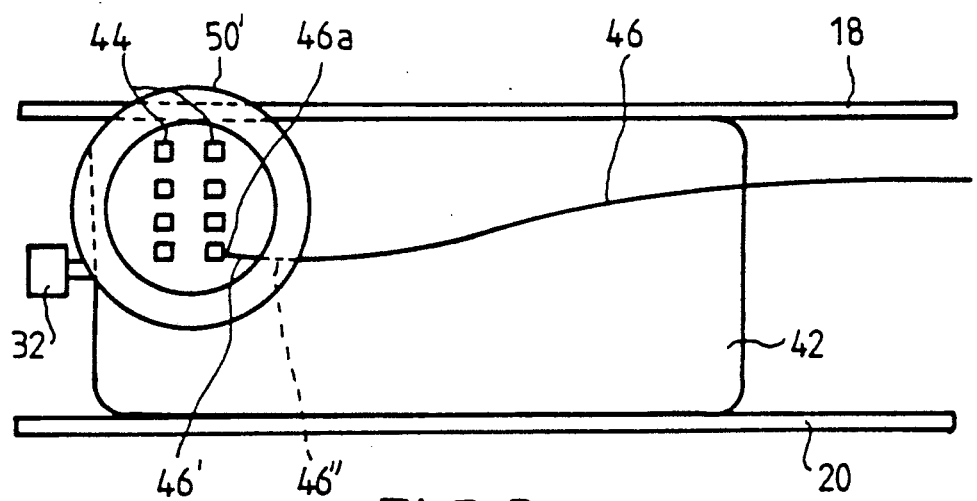
FIG. 3 shows a second way of implanting the conducting plate of the detector.

FIG. 3 shows another possible shape for the conductor plate. The conductor plate 50' is in the form of a ring which completely surrounds the set of electrical contacts 26 of the connection head 14. The plate 50' is of such a size as to pass directly over none of the conducting elements of the connection head so that when a card is in the processing position, none of the conducting elements of the card faces the plate 50'. It will be understood that in the FIG. 3 case, the plate 50' also intercepts all paths leading between the insertion slot 10 and the connection head 14.

A detection circuit 52 is mounted between the plate 50 or 50' and the processing circuit 26 of the reader. The circuit 52 essentially comprises an A.C. electrical signal generator and an A.C. signal detector.

In the absence of any conductor wire 46 connected to any of the conducting blades 26 and going past a detector plate 50 or 50', the circuit 52 is open and no A.C. signal is detected. In contrast, when a conductor wire 46 runs along the guide passage 12, the circuit 52 is closed by the capacitor constituted by the plate 50 or 50' and that portion 46" of the conductor wire which runs from the portion 46' to the end of the wire which is connected to the conducting blade 26. When an A.C. signal is detected, the circuit 52 raises an alarm signal AL on an output 60. The signal AL ay be applied to the control input of a gate 61 interrupting the connection between the conducting blades 26 and the processing circuit 28 of the reader.

A normal memory card includes an electronic module, parts of which are made of metal. However, when a normal card id inserted in the reader, its metal parts do not run the risk of triggering the detector device. When these metal parts go past the detector plate 50 or 50', they are not yet connected to the electrical connection head 14, and when these metal parts of the card are connected to the connection head 14, they no longer face the detection plate 50 or 50'.

Figure 4:
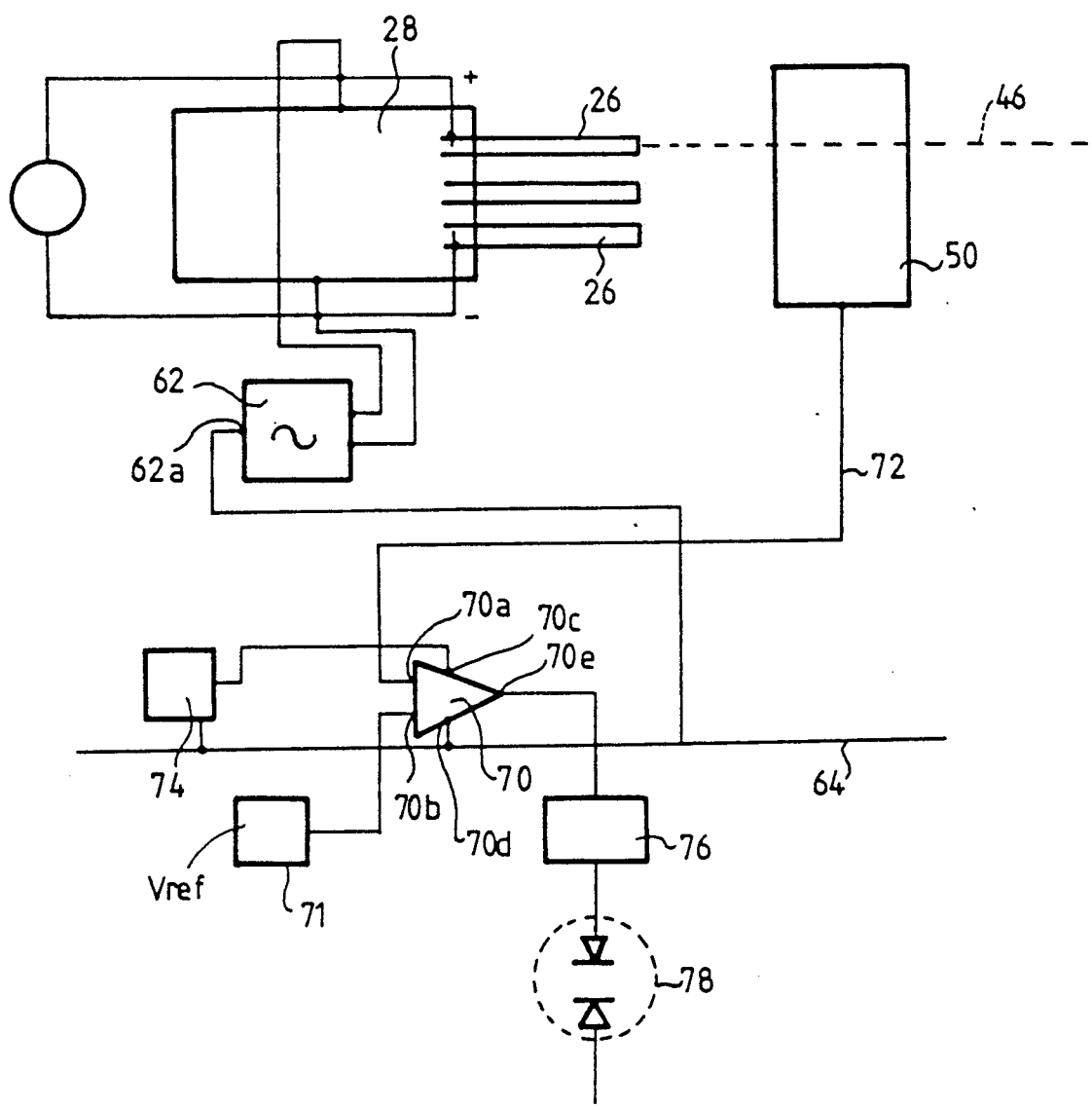
FIG. 4 is a diagram of a first embodiment of the electrical circuit of the detector.

One particular detection circuit 52 is described with reference to FIG. 4. FIG. 4 shows the processing circuit 28 of the reader and three of its electrical contacts 26 in simplified form. It also shows a source 60 for feeding the circuit 28 with electricity. The detector circuit 52 includes an oscillator 62 which is powered from the + and − terminals of the processing circuit 28. The oscillator 62 delivers a signal at a frequency of 70 kHz. The output 62a of the oscillator 62 is connected to a line 64. The detection circuit 62 also includes a comparator 70 which is an operational amplifier. Its input 70a is connected to the conducting plate 50 by conductor 72. Its input 70b receives a reference voltage $V_{ref}$ delivered by voltage generator 71. The comparator 70 is powered by an independent source 74 whose outputs are respectively connected to the line 64 and to power supply terminal 70c of the comparator 70. The output terminal 70e of the comparator is connected to a filter circuit 76 which is itself coupled to an optical coupler 78 whose output delivers the alarm signal AL. The line 64 is the ground line of the detector 70 and of the power supply 74. It is floating relative to the ground line of the processing circuit 28 of the reader.

The detector device operates as follows: when there is no conducting object in the insertion passage 12 of the reader, the electrical circuit powered by the oscillator 62 is open since there is no conducting link between any of the electrical contacts 26 and the conducting plate 50. When a normal card is inserted into the passage 12, i.e. a card which does not have fraudulent wires, the circuit remains open. When the contact tabs on the card go past the plate 50, the contact tabs have not yet made electrical contact with the contact elements 26. When the card arrives in the processing position, the conducting parts of the card are no longer facing the plate 50.

In contrast, when a fraudulent card is inserted into the reader, the conducting wire of said card has one end which is electrically connected to one of the contacts 26 of the reader and a portion of wire necessarily goes past the plate 50. The electrical circuit constituted by the processing circuit 21 together with the flexible blades 26, the oscillator 62, and the detector 70 is thus closed by capacitive coupling between the fraudulent conductor wire and the plate 50. As a result A.C. flows through this circuit. Consequently an alternating voltage is applied to the input 70a of the detector 70. This delivers a signal on its output 70e. This signal is processed by the filter 76 and is transmitted to the alarm circuit via the optical coupler 78.

It can also be seen that the detector 70 has its own power supply 74 which is floating relative to the power supply 60 of the processing circuit 28. If there are no fraudulent wires, the only electrical connection between the detector assembly (detector 70 and power supply 74) is constituted by the oscillator 62. As a result no oscillating signal is applied to the flexible blades 26. Further, since the detector 70 and the processing circuit 28 have different ground lines, a fraudulent wire can be detected even if it is connected to the flexible blade which corresponds to ground.

It will be understood that a fraudulent wire is detected even if no current is flowing therealong. The same happens if the dishonest person takes the precaution of screening the wire. If the screening is floating relative to the fraudulent circuit connected to the free end of the fraudulent wire, then the capacitive coupling between the wire and the plate is further increased. If the screening is connected to the fraudulent circuit, then coupling takes place between the screening and the plate, with the screening being connected to the flexible blade via the fraudulent circuit and its extraneous wire.

In addition, the detector circuit 52 is physically connected to only one conducting blade 26. However, since the circuit 28 of the reader establishes internal connections between these various different blades, a conductor wire in contact with any of the resilient blades can nevertheless be detected.

What is claimed is:

1. A read/write device for electronic memory cards, the device comprising:
   a processing circuit;
   a card insertion slot;
   a connection head including at least one contact element for electrically connecting the circuit of said card to said processing circuit when said card is in a processing position;
   guide means for guiding said card between the insertion slot and the processing position; and
   detector means for detecting an extraneous conductor wire inserted in said device, the detector means comprising a conductor element disposed substantially parallel to the direction of card insertion between said slot and said connection head in order to intercept any path between said slot and said connection head, and an electrical circuit established between at least one of the contact elements of said connection head and said conductor element, said electrical circuit comprising an A.C. signal generator, and a detector for detecting the appearance of an A.C. signal at a point in said circuit due to the effect of capacitive coupling between said conductor element and an extraneous conductor wire electrically connected to said connection element and extending past said plate.

2. A device according to claim 1, in which said A.C. signal generator delivers a signal whose frequency lies in the range about 50 kHz to about 100 kHz.

3. A device according to claim 1, in which said conductive element is a plate.

4. A device according to claim 3, in which said processing circuit is connected to the detector only via said A.C. signal generator.

5. A device according to claim 4, in which said detector is powered by a power supply which is floating relative to said processing circuit.

6. A device according to claim 5, in which said detector includes means for generating a reference voltage and means for comparing the voltage at a point of said electrical circuit with said reference voltage.

7. A device according to claim 1, in which said processing circuit is connected to the detector only via said A.C. signal generator.

8. A device according to claim 7, in which said detector is powered by a power supply which is floating relative to said processing circuit.

9. A device according to claim 8, in which said detector includes means for generating a reference voltage and means for comparing the voltage at a point of said electrical circuit with said reference voltage.

* * * * *